H. P. MILKER.
AIR FILTER.
APPLICATION FILED JUNE 27, 1919.

1,337,020.

Patented Apr. 13, 1920.

WITNESSES

INVENTOR
Herbert P. Milker
BY
ATTORNEYS

UNITED STATES PATENT OFFICE.

HERBERT P. MILKER, OF BROOKLYN, NEW YORK, ASSIGNOR TO CHARLES J. TAGLIABUE MANUFACTURING CO., OF BROOKLYN, NEW YORK, A CORPORATION OF NEW YORK.

AIR-FILTER.

1,337,020.  Specification of Letters Patent.  Patented Apr. 13, 1920.

Application filed June 27, 1919. Serial No. 307,208.

*To all whom it may concern:*

Be it known that I, HERBERT P. MILKER, a citizen of the United States, and resident of Brooklyn, county of Kings, city and State of New York, have invented certain new and useful Improvements in Air-Filters, of which the following is a specification.

My invention relates to air filters and more particularly to that type thereof which is adapted for use in connection with air-operated automatic controllers for regulating temperature, pressure, liquid levels, timing of operations or processes, etc. In such controllers it is necessary, in order to secure efficient operation, to filter the air which passes through the air valve thereof, in order to prevent particles of pipe scale or other foreign matter, as well as oil particles and oil vapor, from reaching said air valve.

The object of my invention is to provide a simple filter whereby the desired filtering of the air may be positively and efficiently accomplished, said filter including, as the active filtering medium, a tubular fabric, commonly known as lamp wick, and having physical characteristics particularly adapting it for filtering purposes of the kind in question. My invention will be fully described hereinafter and the features of novelty will be pointed out in the appended claim.

Figure 1:
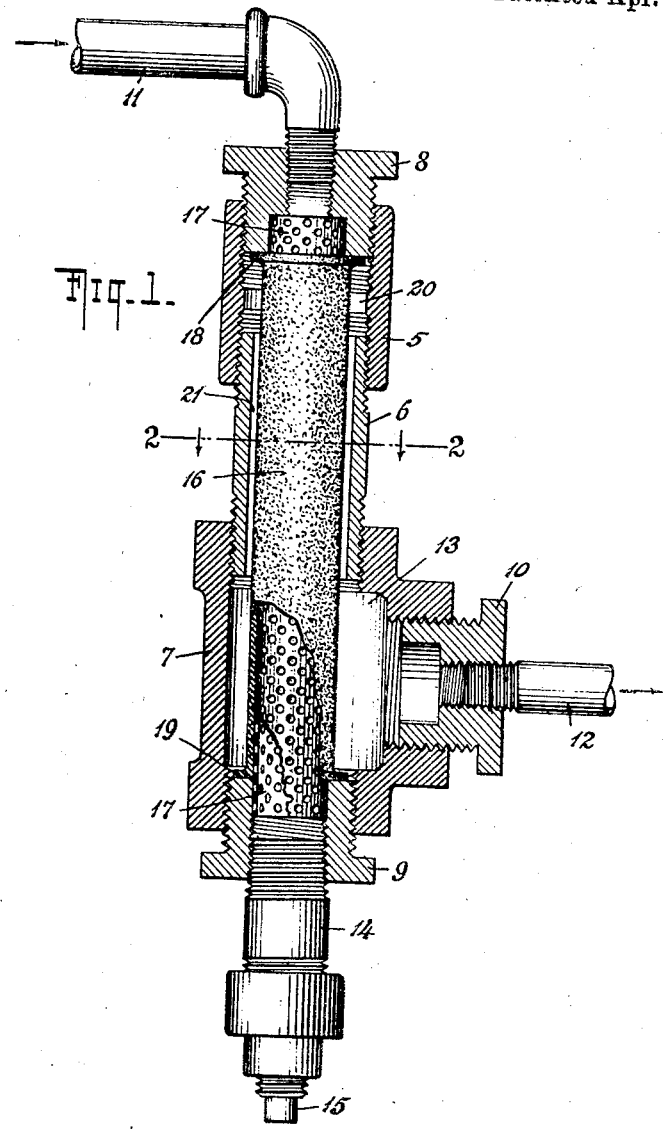
Figure 2:
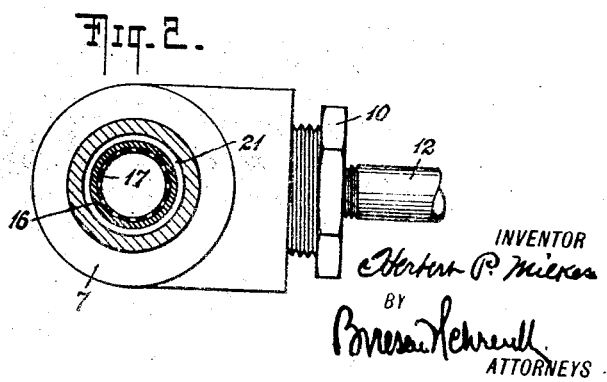

In the accompanying drawings, which for the purpose of illustration and description, show an example of my invention, Figure 1 is a longitudinal section with parts broken away; and Fig. 2 is a horizontal section on the line 2—2 of Fig. 1.

The arrangement shown in the drawings and whereby use of my invention is illustrated, comprises a coupling 5, a section of pipe 6, and a T-fitting 7, connected together to form a unit or shell, suitable bushings 8, 9 and 10 being located at opposite ends of said unit and connected with said T-fitting 7 respectively as shown in Fig. 1. An air-inlet pipe 11 which may communicate with a suitable source of air supply under pressure is connected with the bushing 8 so as to communicate with the interior of the aforesaid unit and an air outlet pipe 12 which may lead to the air valve of an automatic controller of the type previously referred to, is connected with the bushing 10 so as to communicate with the chamber 13 of the T-fitting 7, as shown in Fig. 1. A nipple 14 is screwed into the bushing 9 and provides a trap for water, oil, and other foreign matter which may be readily removed from said trap by removing the plug 15 or through a suitable cock which may replace said plug 15 if desired.

The active filtering element comprises a fabric tube 16 constructed of woven, cotton lamp wick supported against collapsing in any convenient manner, as, for instance, by being exteriorly fitted upon a foraminated tube 17 of metal or other suitable material. In the illustrated example the foraminated tube 17 projects beyond the opposite ends of the wick tube 16 into the bushings 8 and 9 respectively which are provided with recesses for the reception of the ends of said tube 17; the latter is rigidly secured in position by said bushings 8 and 9 which are adjusted to exert a pressure on said tube 17 in an axial direction. The opposite ends of the wick tube 16 are turned over so as to form outwardly projecting annular flanges 18 and 19 which engage the inner faces of the bushings 8 and 9 respectively and act as seals whereby the joints between the tube 17 and the two bushings 8 and 9 are efficiently sealed.

It will be noted in the illustrated example that the pipe 6 and a portion of the coupling 5 surround the wick tube 16 at a distance whereby annular spaces 20 and 21 are formed between these elements.

In practice, the air enters the interior of the foraminated tube 17 through the inlet pipe 11 and passes out through the foraminations thereof and through the wick tube 16 into the annular spaces 20, 21, and chamber 13 from which said air flows through the outlet pipe 12 to the air valve of the automatic controller previously mentioned. In some instances the air may enter through the pipe 12 and after passing through the wick tube 16 to the interior of the foraminated tube 17, may flow out through the pipe 11 to the point at which the air is used.

In either case the air in passing through the wick tube 16 is thoroughly filtered and flows out through the outlet pipe in a purified condition and entirely free from any foreign matter which in any way might interfere with the efficient operation of the aforesaid air valve.

The physical characteristics of the woven cotton lamp wicking of which the tube 16 is constructed, make it particularly effective in filtering the air without retarding the flow thereof to any appreciable extent. The wicking 16 not only prevents all particles of foreign matter from passing through but also condenses oil vapors and the like and prevents same from reaching the outlet pipe 12.

Experiments have positively shown the efficiency of the lamp wicking as an air filtering medium and have also demonstrated its superiority over other fabrics such as canvas, cheese cloth and felt. Canvas is of too dense a construction and obstructs the passage of the air while cheese cloth is not dense enough and does not perform the filtering operation efficiently enough to answer the requirements. Felt, which may be of the proper filtering density, by reason of its physical characteristics, tends in time to disintegrate and thus permit particles of felt to be carried along with the air to the air valve. A foraminated screen alone fails also to provide adequate filtration of the air. The cotton lamp wick overcomes all of these objections and in tubular form is readily obtainable almost anywhere, thus making it possible to replace the active filtering medium with a minimum of trouble, delay and expense. At the same time, the tubular lamp wicking does away with the necessity for complicated constructions in which sheets of material are wrapped about supports or in which the filtering material is otherwise specially constructed and mounted.

My filter is simple in construction and arrangement and easily and quickly removed and replaced and at the same time is of maximum filtering efficiency. No particularly skilled attention is required and adjustments of special characteristics are entirely avoided. Such foreign matter as collects in the trap 14 may be readily blown therefrom, from time to time, either through a suitable cock or by removing the plug 15.

Various changes in the specific form shown and described may be made within the scope of the claim without departing from the spirit of my invention.

I claim:

An air filter comprising a shell having an inlet and an outlet and provided with an interior recess, an annular shoulder in said shell surrounding said recess, a foraminous tube within said shell and having its one end fitted within said recess, a tubular element of woven, cotton lamp wicking upon said foraminous tube, said element at its one end extending transversely to its axis to form an outwardly extending annular flange in engagement with said annular shoulder and means adjustably connected with said shell whereby the other end of said foraminous tube is supported and whereby said tube is movable lengthwise of its axis to force said annular flange against said annular shoulder to seal the joint between said tube and the wall of said recess.

In testimony whereof I have hereunto set my hand.

HERBERT P. MILKER.